UNITED STATES PATENT OFFICE.

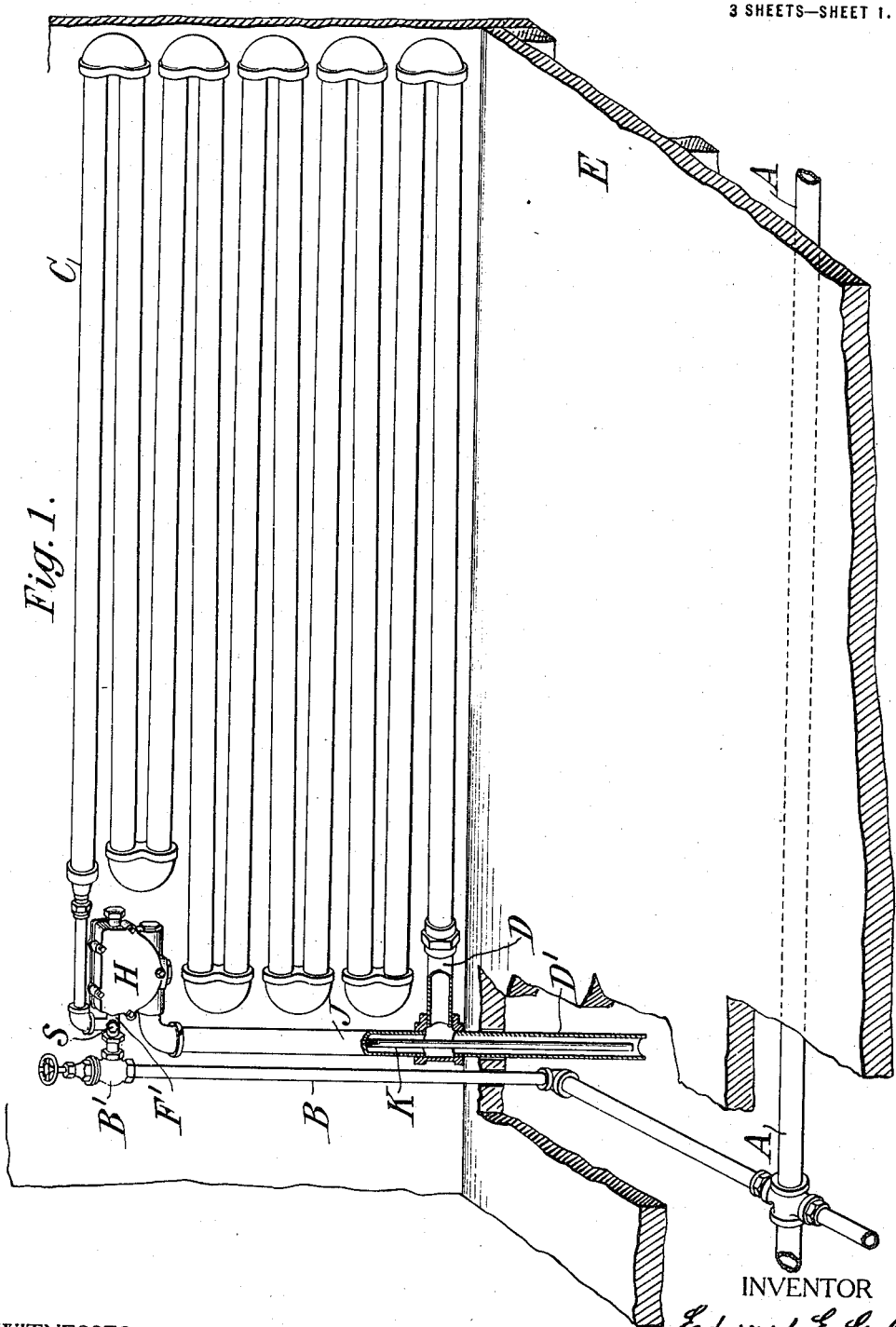

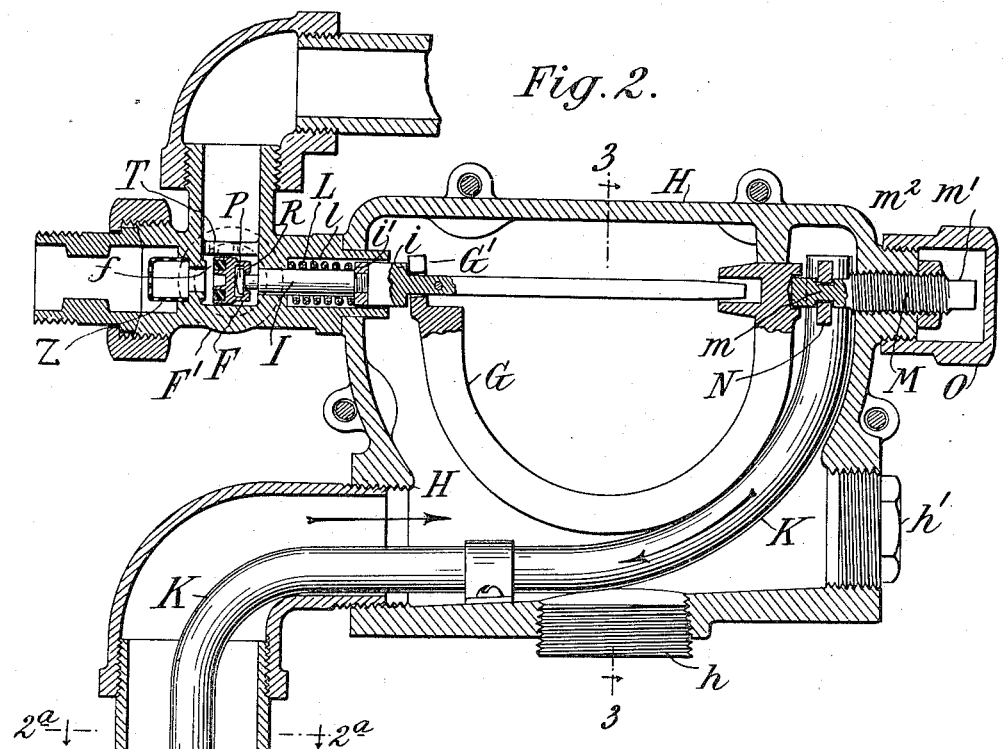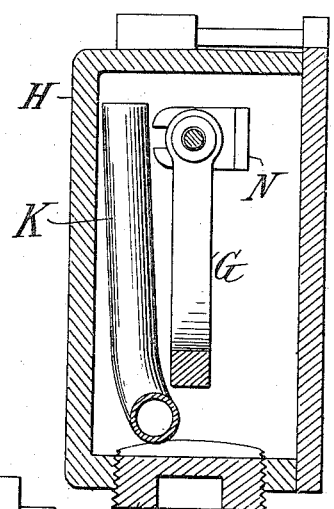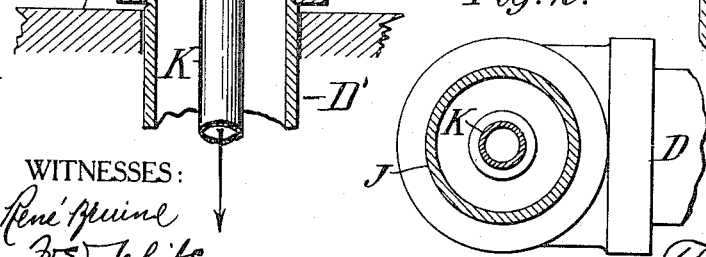

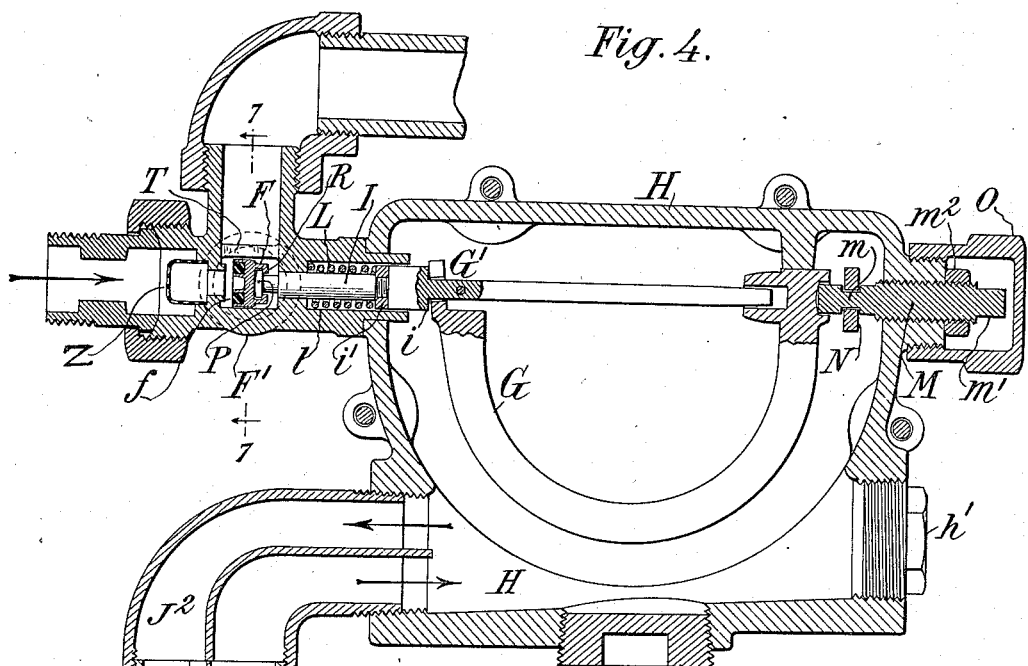
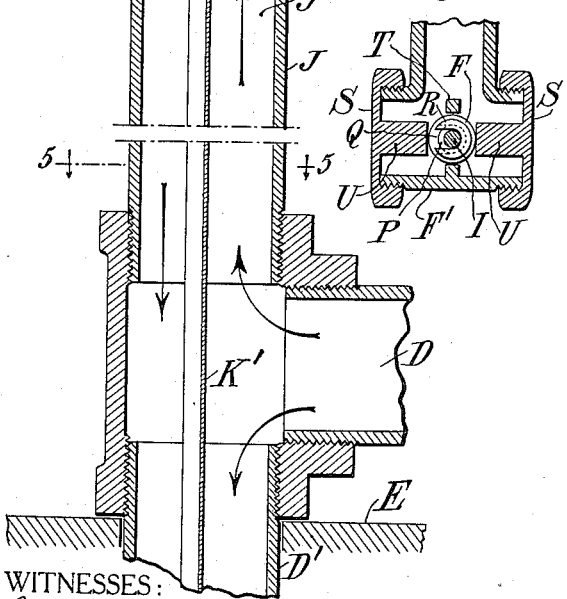
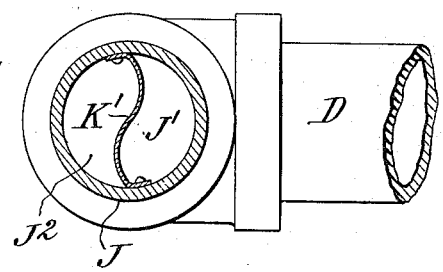
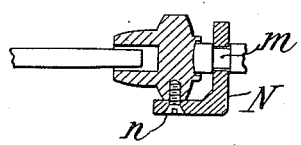

EDWARD E. GOLD, OF NEW YORK, N. Y., ASSIGNOR TO GOLD CAR HEATING & LIGHTING COMPANY, OF NEW YORK, N. Y., A CORPORATION OF NEW YORK.

STEAM-HEATING SYSTEM.

1,168,720.      Specification of Letters Patent.      Patented Jan. 18, 1916.

Application filed October 7, 1915. Serial No. 54,555.

*To all whom it may concern:*

Be it known that I, EDWARD E. GOLD, a citizen of the United States of America, residing in the borough of Manhattan, city, county, and State of New York, have invented certain new and useful Improvements in Steam-Heating Systems, of which the following is a specification.

My invention relates to a steam heating system and has for its object to provide an improved control for a steam valve in said system by the means of a thermostat which is affected by the temperature of steam passing out of the return pipe of the system.

I have illustrated my invention as applied to the well known vapor system which has an open outlet and wherein the steam in the radiating pipes is maintained at substantially atmospheric pressure, and a thermostat is provided adjacent the outlet which controls an automatic supply valve and is so adjusted that it is unaffected by the passage of water of condensation, but is affected by the passage of steam through the outlet to close the inlet valve. Systems of this character are well known and although I have illustrated my invention as applied to such system it is not necessarily limited thereto, but might if desired be used in connection with other systems such as a pressure system, or to control other valves than the inlet valve, for instance the outlet valve in such system.

In the particular embodiment of my invention illustrated in the accompanying drawings, Figure 1 illustrates a portion of a steam heating system provided with my invention, parts being shown in section. Fig. 2 is a sectional view of my invention illustrating parts of the supply and outlet pipes of a vapor steam heating system. Fig. 2ª is a cross-section on the line 2ª—2ª, Fig. 2. Fig. 3 is a cross section on the line 3—3, Fig. 2. Figs. 4 and 5 are views similar to Figs. 2 and 3 illustrating a modified form of my invention. Fig. 6 is a detail illustrating the means of supporting one end of the thermostat. Fig. 7 is a detailed view of a valve plug and of an opening in the valve casing through which the valve disk may be removed.

I have illustrated my invention as applied to a steam heating system of the atmospheric pressure or vapor type, wherein steam is taken from the train pipe A and conducted through branch B to the radiator C which has a return pipe D connected to an outlet pipe $D^1$ which passes through the floor E of the car and discharges to the atmosphere. The supply pipe B has a hand controlled valve $B^1$ and an automatically controlled supply valve F which is situated within the valve casing $F^1$.

According to my invention improved means are provided for controlling the valve F, and such means include a thermostat such as the thermostat G. This thermostat is located in a casing H and has an operative connection with the valve F through valve stem I. The thermostat casing is provided with a plurality of passages, one communicating with the outlet of the return pipe D and the other with the outer air. Such passages are conveniently formed as illustrated in the preferred form of Figs. 1, 2 and 3, where a pipe J is attached to the outlet pipe D and leads upward therefrom to the thermostat casing H preferably opening into the same at the lower part thereof. A pipe K communicates at its inner end with the interior of the casing H preferably at the upper part thereof, and at its outer end with the external atmosphere below the car floor E. This pipe K is preferably disposed as shown within the pipes J, $D^1$, and extends across the end of pipe D and preferably near the lower end of pipe $D^1$ which leads outside of the car. The said pipe K preferably terminates a short distance, about one inch above the bottom of pipe $D^1$ so that steam escaping through the pipe D will pass the mouth of pipe K and tend to create a circulation therein. The upper end of pipe K extends inside of the casing H. The said pipe J conducts any steam which may escape through the outlet D upward through the channel $J^1$ as indicated by arrows and in the casing H where it will affect the thermostat G by causing the same to expand and thereby closing the inlet valve F. Air which is liberated by the condensation of the said steam will then pass downward through the pipe K to the atmosphere. The circulation outward from casing H through pipe K tends to assist the circulation toward said casing through channel $J^1$ and therefore any escape of steam from the outlet of pipe D tends to cause said steam to be drawn into the casing H.

It is an important part of my invention that means should be provided for conducting any steam which may escape from the return pipe D to the thermostat casing H, and that means should also be provided for permitting the escape of air from the said thermostat casing. Experiments have shown that the mere connection of the outlet from the return pipe D with the thermostat casing H by means of a pipe without means being provided to permit the escape of air from the thermostat casing is ineffective to permit steam which escapes from the return pipe to pass into the thermostat casing, and therefore where a single pipe as J is employed to connect the return pipe D with the thermostat casing the provision of some means for the escape of liberated air, such as pipe K is important. It is not however essential that the pipe K should be located in the precise position shown with relation to the return pipe or the thermostat casing. I prefer this arrangement however.

The modified form of Figs. 4, 5 and 6 provides a partition $K^1$ which is located in pipes $D^1$, J and divides the same into two channels $J^1$ and $J^2$. Channel $J^1$ connects the end of return pipe D with the interior of casing H and serves to convey any steam or hot vapor which may escape from the pipe D to casing H where it will be in position to affect thermostat G. Channel $J^2$ serves to conduct air liberated by the condensation of the steam away from the casing H and serves to provide the necessary circulation whereby vapor or steam is caused to pass into the casing through channel $J^1$. The channel $J^1$ is located at the bottom of the thermostat casing H, in which position it serves to drain the casing of water of condensation.

The particular type of apparatus which I have illustrated employs a thermostat G made of a suitable metal in the form of a bow. This thermostat at its free end $G^1$ is perforated to permit the passage of the valve stem I and the valve stem is provided with a shoulder $i$ against which the said free end abuts in order to move the valve F to closed position. A spring L is situated in a recess $l$ in the valve casing $F^1$, and bears at one end against the inner wall of the said casing, and at the other end against shoulders $i^1$ of the valve stem. This spring serves to hold the valve stem in contact with the free end of the thermostat G.

The thermostat is supported upon a screw bolt M which is threaded into a wall of the casing H and which has a slotted bracket N mounted in a groove $m$ in said bolt, and attached as by screw $n$ to the end of the thermostat G (Fig. 6). The said screw bolt M passes through the casing and has a squared head $m^1$ whereby the same may be adjusted. A lock nut $m^2$ holds the screw bolt in adjusted position. By reason of the fact that the thermostats are illustrated as adjustable and that this adjustment is performed by a skilled person and that after it is performed it is undesirable that it should be changed except by one equally skilled I provide a removable cap O for protecting the thermostat from a change in adjustment, which surrounds the outer end of the adjusting bolt M and is threaded on to the casing H. Access to the interior of the casing for drainage or repairs or cleaning is provided by removable plugs $h$, $h^1$.

Heretofore in devices of this character it has been difficult to remove the valve disk F for purposes of repairing, wear or replacing the said valve or parts thereof, and when the valve disk was removed it involved taking apart the apparatus and destroying the adjustment of the thermostat. Therefore, unless this adjustment was restored by a skilled person, which was seldom the fact, the valve would not operate perfectly and would either close too late leading to overheating the car or too soon causing the car to be under heated. Accordingly my invention includes as a part thereof the provision of means whereby the valve F may be removed and replaced easily and without disturbing the adjustment of the thermostat. For this purpose I make the valve F removable from its stem I, and this may be accomplished by forming the valve stem with a head P which is inserted into an open recess Q in the valve disk, and engages beneath the overhanging walls R of said recess as seen in Fig. 5, so that the valve disk may easily be removed from the stem by sliding the same out sidewise.

The valve casing $F^1$ is provided with an aperture in its side through which the valve disk F may be removed, and this aperture is closed by a cap S which is threaded into the casing so as to be removable therefrom. Preferably apertures are formed on each side of the casing and two caps S are used. Guides T are formed in the casing for guiding the valve F in conjunction with guides U carried by the caps S and these guides keep the valve disk F in position relative to its seat. The valve has a wearing face $f$ which may be replaced when worn and is preferably made of Vulcabeston. It is protected by a strainer Z.

I have illustrated the most desirable form of constructing my invention now known to me but I do not consider that the invention is limited to the particular details of construction illustrated nor to the particular steam heating system shown, as the same system or details of construction may be changed as hereinbefore suggested and in other respects within the skill of a steam engineer and within the limits of the following claims.

What I claim is:—

1. A steam heating system having a supply pipe, a radiator and a return pipe, a valve in one of said pipes, a thermostat and a valve stem operatively connecting said thermostat and said valve, a casing for said thermostat located above the outlet of said return pipe, a discharge pipe leading from said outlet upward to said casing adapted to conduct escaping steam to said casing and to discharge water of condensation from said casing, and a tube located within said discharge pipe and extending from a point within said casing at the upper part thereof to a point adjacent the outer air and above the lower end of said discharge pipe and adapted to conduct air from said casing.

2. A steam heating system having a supply pipe, a radiator and a normally open return pipe, a valve in said supply pipe, a thermostat and a valve stem operatively connecting said thermostat and said valve, a casing for said thermostat located above the outlet of said return pipe, a discharge pipe leading from said outlet upward to said casing and means dividing said pipe into two longitudinal passages, one of said passages adapted to conduct escaping steam to said casing and the other passage adapted to discharge air from said casing, said dividing means terminating within said pipe.

3. A steam heating system having a radiator, a supply pipe and a return pipe, an adjustable thermostat, a casing therefor above the outlet of said return pipe, a valve stem operatively connected to said thermostat, a valve disk located in one of said pipes and mounted on said stem and removable sidewise therefrom while said stem is within said casing, and said pipe having an aperture in its side adapted to permit the withdrawal of said valve disk, a cover for said aperture detachable from said pipe to permit the withdrawal of the valve disk, a pipe connected to the outlet from said radiator and leading upward to said casing and two passages in said pipe, one adapted to conduct escaping steam to said casing and the other to discharge air from said casing.

4. A valve casing, a thermostatically actuated valve stem entering said casing and having an enlarged head, a valve disk having a slot to receive said head whereby said disk is mounted on said stem and is removable therefrom while said stem is in said casing, said casing having an aperture adjacent said valve disk and a cover for said aperture detachable from said casing to permit the withdrawal of said valve disk through said aperture and means for adjusting said valve stem whereby the valve disk may be removed without disturbing said adjustment.

5. A valve casing, a thermostatically operated valve stem entering said casing, means for adjusting said valve stem, a valve disk, means for mounting said valve disk on said stem so as to be removable therefrom while said stem is in said casing, said casing having an aperture adjacent said valve disk, and a cover for said aperture detachable from said casing to permit the withdrawal of said disk through said aperture without disturbing the adjustment of said stem.

6. A valve casing, a thermostatically operated valve stem entering said casing, means for adjusting said stem, a valve disk mounted on said stem, and removable sidewise therefrom while said stem is in said casing, said casing having an aperture adjacent said valve disk and a cover for said aperture detachable from said casing to permit the withdrawal of said valve disk through said aperture without disturbing the adjustment of said stem, guides in the casing for said valve stem and a guide in said cover and removable therewith.

7. A steam heating system having a radiator, a supply pipe and a return pipe, a valve in said supply pipe and means for controlling said valve comprising a thermostat operatively connected to said valve, a casing inclosing said thermostat, a discharge pipe connected to said casing and leading across the outlet from said radiator and in open communication with said outlet and adapted to conduct steam escaping through said outlet to said casing, a tube located within the said discharge pipe and extending into said casing and having its opposite end extending beyond the outlet of said radiator, and terminating within said discharge pipe, and a short distance from the end thereof, and adapted to conduct air from said casing.

8. A steam heating system having a radiator, a supply pipe and a return pipe, a valve in said supply pipe and means for controlling said valve comprising a thermostat operatively connected to said valve, a casing inclosing said thermostat, a discharge pipe connected to said casing and leading across the outlet from said radiator and in open communication with said outlet and adapted to conduct steam escaping through said outlet to said casing, a tube located within the said discharge pipe and extending into said casing and having its opposite end extending beyond the outlet of said radiator, and terminating within said discharge pipe, and a short distance from the end thereof, and adapted to conduct air from said casing, said thermostat casing communicating with said radiator only through said return pipe.

9. A steam heating system having a supply pipe, a radiator and a normally open return pipe, a valve in said supply pipe, a thermostat and a valve stem operatively connecting said thermostat and said valve, a casing for said thermostat located above the outlet of said return pipe, a discharge pipe leading from said outlet upward to said casing and means dividing said pipe into two longitudinal passages, one of said passages adapted to conduct escaping steam to said casing and the other passage adapted to discharge air from said casing, said dividing means terminating within said pipe, said thermostat casing communicating with said radiator only through said return pipe.

In witness whereof, I have hereunto signed my name in the presence of two subscribing witnesses.

EDWARD E. GOLD.

Witnesses:
HENRY M. TURK,
FRED WHITE.

Copies of this patent may be obtained for five cents each, by addressing the "Commissioner of Patents, Washington, D. C."